United States Patent [19]

Cowan et al.

[11] Patent Number: 4,797,029
[45] Date of Patent: Jan. 10, 1989

[54] REMOTELY INSTALLING A TUBULAR STRING

[75] Inventors: William S. Cowan, Southside Place; Edward M. Galle, Jr., Houston, both of Tex.

[73] Assignee: National Oilwell, Houston, Tex.

[21] Appl. No.: 934,285

[22] Filed: Nov. 24, 1986

[51] Int. Cl.$^4$ .......................... E21B 7/128; F16L 1/04
[52] U.S. Cl. .................................. 405/170; 166/338; 166/341; 405/169
[58] Field of Search ............... 405/169, 170, 171, 225, 405/203, 204; 285/27; 166/338–345

[56] References Cited

U.S. PATENT DOCUMENTS

| | | | |
|---|---|---|---|
| 3,220,245 | 11/1965 | Van Winkle | 166/341 X |
| 3,247,914 | 4/1966 | Slack | 166/339 X |
| 3,434,295 | 3/1969 | Manning | 405/170 |
| 3,721,293 | 3/1973 | Ahlstone et al. | 166/335 |
| 3,825,285 | 7/1974 | McArthur et al. | 285/27 |
| 4,067,385 | 1/1978 | Schwager et al. | 166/343 |
| 4,095,649 | 6/1978 | Chateau et al. | 285/27 X |
| 4,109,476 | 8/1978 | Garcia | 405/169 |
| 4,188,156 | 2/1980 | Fisher et al. | 405/195 |
| 4,260,289 | 4/1981 | Moinard | 405/169 |
| 4,399,872 | 8/1983 | McConaughy et al. | 166/341 |
| 4,433,939 | 2/1984 | Regan | 405/169 X |
| 4,436,454 | 3/1984 | Ninet et al. | 405/204 |
| 4,554,976 | 11/1985 | Hynes et al. | 166/341 |
| 4,611,829 | 9/1986 | Hughes | 285/18 |
| 4,635,728 | 1/1987 | Harrington | 166/341 |

FOREIGN PATENT DOCUMENTS

2056009 3/1981 United Kingdom ............... 166/342

Primary Examiner—Dennis L. Taylor
Attorney, Agent, or Firm—Robert J. Bunyard; Robert H. Johnson; Larry A. Fillnow

[57] ABSTRACT

Connecting a tubular string to a subsea installation. The tubular string includes a short first section and a longer second section. The length of the first section is approximately one-half the depth between the lowermost guide ring of a fixed platform and the top of the subsea installation. One end of the first section is provided with a connector and the other end with a connector and a funnel. The first section is lowered through the guide rings and connected to the subsea installation. One end of the second section is provided with a connector and the second section is lowered through the guide rings and into the funnel. Since the two adjacent ends are about midway between the subsea installation and the lowermost guide ring, the adjacent ends are easily bent into alignment by the camming action resulting when the end of the second section slides along the inside tapered surface of the funnel when the axes of the platform and subsea installation are offset.

5 Claims, 8 Drawing Sheets

REMOTELY INSTALLING A TUBULAR STRING

BACKGROUND OF THE INVENTION

This invention relates to remote connection of a tubular string to a subsea installation and particularly for connecting a production riser to a subsea wellhead.

It has been known to run a tubular string by guidelines or through guide rings from floating production vessels or fixed platforms down to seabed installations such as wellheads or mudline casings. A similar operation is conducted in tieback systems after well drilling and well completion. Because of the influence of ocean currents, wind or construction error to the guiding mechanisms on surface platforms, a tubular string frequently will not be aligned directly over a subsea installation.

The current approach to tying back a subsea well is to attempt to remotely stab a tubular connection into or over a subsea receptacle. This subsea connection could be a threaded joint, a "squnch" or stab-type joint, a hydraulically or mechanically actuated connector, or any of a multitude of similar type joints. All that is required of the connection is that it provide a pressure-tight joint that is strong in tension, compression and bending. The current approach works well as long as the tubular string can be positioned vertically over the receptacle prior to make-up. Because of the structural constraints of the platform or production facility, or the effects of the environmental conditions, a vertical connection is sometimes difficult, if not impossible, to obtain.

The most frequently encountered problem is tilted and/or off-center platform. In this case, the platform guide rings constrain the tubular string to remain approximately parallel to the centerline of platform. To make the remote connection, the tubular string must be bent into the appropriate shape to make the transition between the platform centerline and the subsea installation centerline. This bend must take place between the lower platform guide ring and the subsea installation. The tubular string cannot always be pre-bent or it would not pass through the platform guide rings. The only alternative is to bend the lower end of the tubular string remotely.

A tubular string can be bent into a simple arc or an S-shape. To form either shape, a moment must be applied to the tubular string at the lower end. Since the only load inputs available are push, pull, and rotation on the top end of the tubular string, some means must be provided at the bottom end of the tubular string to input a moment. This is typically attempted with a funnel, either on the bottom end of the tubular string or on the top end of the subsea installation. Sometimes an elastomeric flex joint is provided at the lower end of the tubular string to make the tubular string more flexible and thus easier to bend to match the subsea installation centerline. Others have made flex joints that can be remotely bent with hydraulic cylinders or by divers.

When the tubular string is bent into the appropriate shape, the maximum bending moment in the tubular string is located at the two fixed ends. The bending moment is a minimum somewhere near the halfway point between the two fixed ends (the lowest platform guide ring and the subsea installation). Most of the prior art methods of tying back try to bend the tubular string at the lower end where it takes the maximum bending moment to bend the tubular string. In many combinations of platform offset and tilt, the tieback simply cannot be done with the existing systems and the platform must be modified or the operation abandoned.

U.S. Pat. No. 4,433,939 proposes a method of aligning the lower end of a marine conductor to a wellhead to which it is to be connected. After the marine conductor is run into the sea to a location adjacent the wellhead, an articulated bending tool is run from the platform or vessel within the conductor while it is suspended over the wellhead. Hydraulic fluid under pressure is run from the surface facility to the bending tool to induce the desired curvature in the conductor to achieve alignment with the wellhead.

The present invention provides a method whereby the lower portion of a tubular string is first connected to a seabed installation and then loaded at a point away from its lower end. By moving the loading point away from the lower end of the tubular string, the bending deflection for a given input load may be maximized. This allows the operator to tie back with ease and increase the amount that the surface facility can be offset or tilted. Requiring less precision in setting the surface facility results in cost savings during the setting and piling operation.

BRIEF SUMMARY OF THE INVENTION

This invention relates to a method of connecting a tubular string to a subsea installation. A first section of the tubular string is prepared by installing a connector on both ends of the section. The first section is lowered from a surface facility and one end is connected to the subsea installation. A second section of the tubular string is provided with a connector on one end. The second section is lowered from the surface facility and connected to the first section. If the surface facility and subsea installation are misaligned, a guide means is provided on one of the adjacent ends of the first and second sections. An axial force is transferred from the second section, through the guide means, and into the first section thereby easily bending the two sections into alignment allowing the two sections to be connected.

It is a principal object of our invention to provide an improved method of connecting a tubular string to subsea installation especially when the tubular string is not in alignment with the subsea installation.

An advantage of our invention is that less precision is required in setting the surface facility and no special tools or equipment modifications are required when establishing the tubular string to a seabed installation.

The above and other objects, features and advantages of our invention will become apparent upon consideration of the detailed description and appended drawing.

DETAILED DESCRIPTION OF THE PREFERRED EMBODIMENT

Figure 1:
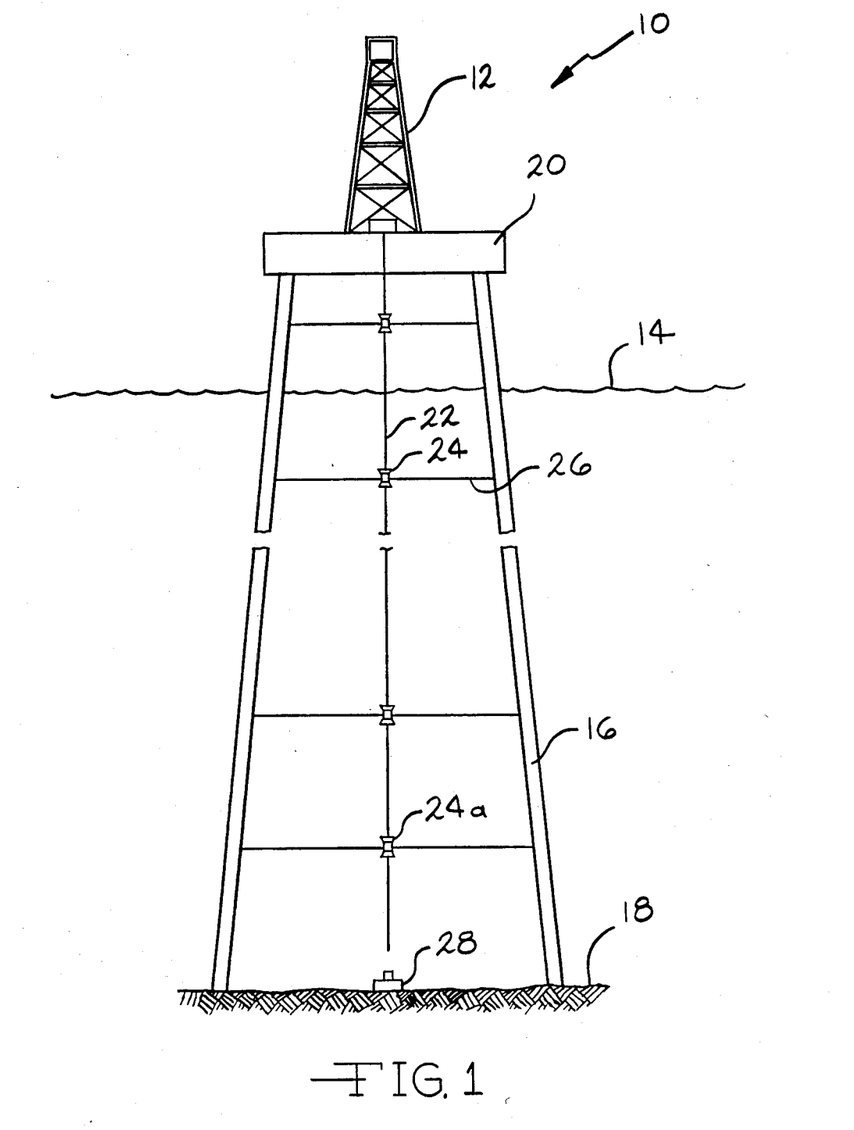
FIG. 1 is a schematic elevational view of a tubular string about to be connected to a subsea installation wherein the tubular string is being lowered from a surface platform.

Referring to FIG. 1, reference numeral 10 generally refers to a surface facility such as a fixed platform including a derrick 12 standing in a body of water 14. Platform 10 is supported by legs 16 which are piled into a seabed 18. A series of tubular members such as a production riser are connected into a tubular string 22 at a deck 20 on platform 10. As the tubular members are added to the top end, tubular string 22 is gradually lowered through a series of alignment or guide rings 24 structurally connected to legs 16 by support arms 26. The lower end of tubular string 22 ultimately arrives at and is connected to a subsea installation 28.

Figure 2:
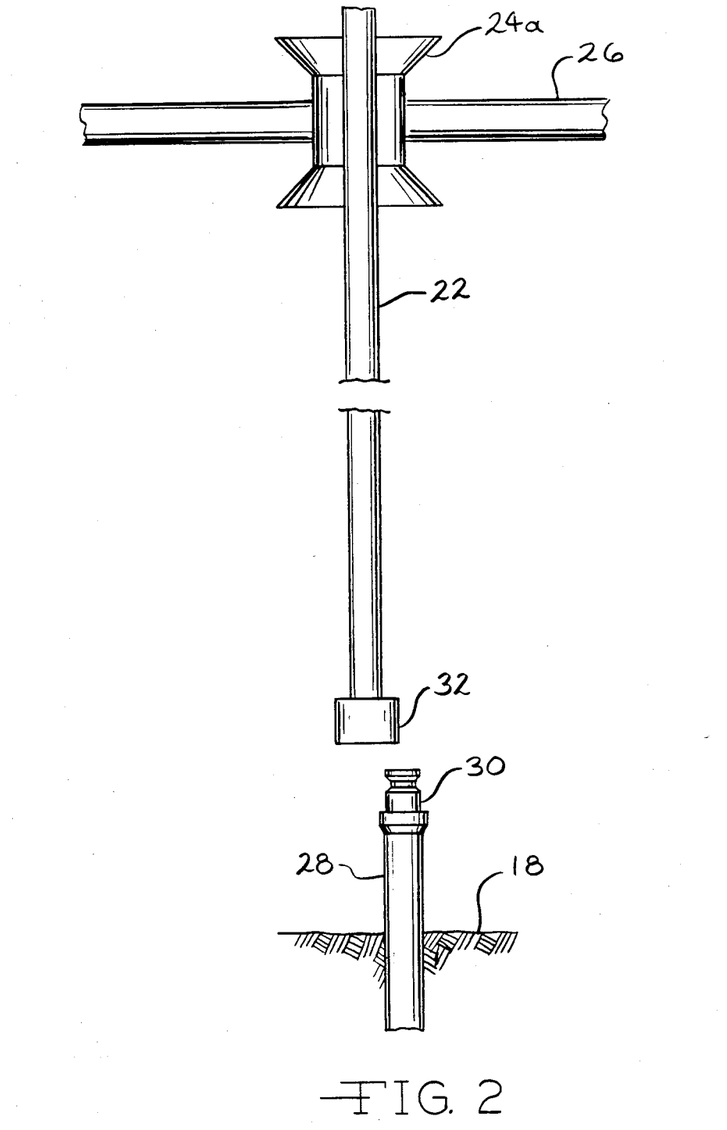
FIG. 2 shows a partial elevational view when the surface platform is not aligned and/or is offset relative to a subsea installation.

FIG. 2 shows a conventional connector 32 on the lower end of tubular string 22 to be connected to subsea installation 28 such as a conventional wellhead body 30. The lower end of tubular string 22 is slightly offset or misaligned with respect to the vertical axis of wellhead body 30. Environmental influences such as wind and/or ocean current may cause tilting of the platform during its installation resulting in this misalignment. Current may also cause slight bending of tubular string 22 between lowermost guide ring 24a of platform 10 and wellhead body 30 resulting in misalignment. Construction error when driving piles for legs 16 or inaccurate alignment of guide rings 29 may result in tilt or offset between the guide axis of the platform and the vertical axis of the wellhead body.

When such a misalignment or offset occurs, connector 32 will not readily engage with wellhead body 30. Attempting to apply a vertical load to tubular string 22 to force connector 32 onto wellhead body 30 when tubular string 22 is not aligned may cause damage to the mating portions of wellhead body 30 and connector 32 and may actually exacerbate the misalignment. Conventional wisdom would suggest to apply an external lateral load to the bottom portion of tubular string 22 until it is axially aligned with wellhead body 30.

FIGS. 3-9 illustrate how our invention is used to remotely connect a tubular string to a subsea installation. A first section 34 having a first end 36 and a second end 38 may be assembled at deck 20 on platform 10. A connector such as conventional wellhead connector 32 is placed on end 36 and a conventional connector 56 and a guide means such as funnel 46 are placed on end 38. Section 34 is then lowered such as by a relatively flexible drill pipe or a wire rope (not shown) through guide rings 24 and connected to wellhead body 30. For example, the lower end of a drill pipe 48 is provided with a tool 49. Tool 49 of drill pipe 48 is inserted through funnel 46 and connected to connector 56 of second end 38 of section 34. Section 34 is then lowered from deck 20 through guide rings 24 using drill pipe 48 until well headbody 30 is engaged. Connector 32 is then connected to wellhead body 30. Tool 49 is then disengaged from connector 56 and drill pipe 48 is withdrawn back to platform 10 (see FIG. 3). Unlike FIGS. 1 and 2 where tubular string 22 is fixed by lowermost guide ring 24a, upper end 38 of section 34 is not fixed. End 36 of section 34 is easily guided, aligned and connected to wellhead body 30.

Figure 3:
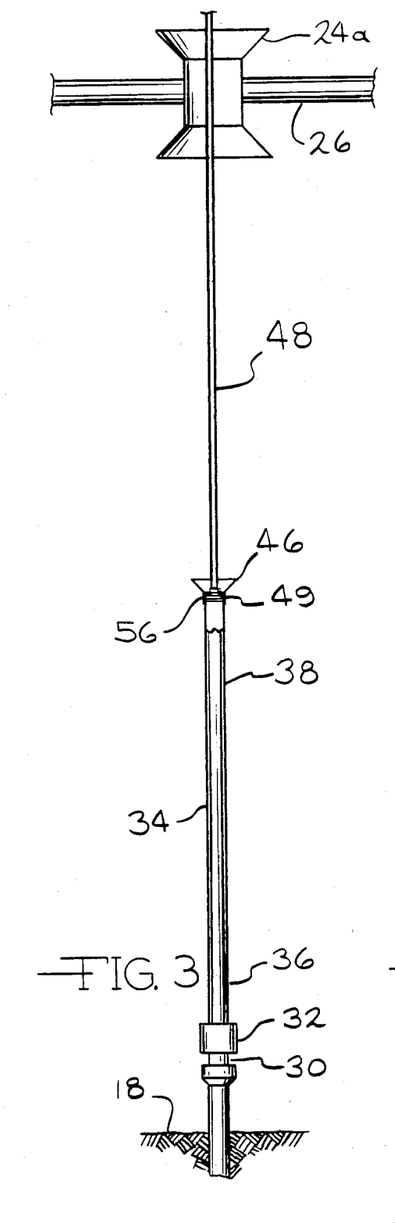
FIG. 3 is a partial elevational view, partially in section, for connecting a first section of a tubular string to a subsea installation using a drill pipe by the method of our invention.

For the subsea installation shown in FIG. 3, connector 32 attached to end 36 of section 34 acts as a female receptacle for being placed over the male portion of wellhead body 30. It will be understood by those skilled in the art the connector on end 36 of section 34 could also be a male member for being received into the inner bore of a wellhead body. In that event, the connector could be a stab-type or threaded connector. It will also be understood our invention could be used with subsea installations other then wellhead bodies, e.g., mudline casings. Since upper end 38 of section 34 is not fixed at the lowest guide ring, connecting even threaded joints to a subsea installation is easy because external bending and shear loads are low at lower connection end 36.

The second step of our invention is to assemble a second section 40 of tubular string 22 at deck 20 of platform 10. Section 40 includes a first end 42 and a second end 44. End 42 will be prepared with a suitable stab or threaded connector 43 as is well known. Tubular members are sequentially connected and section 40 is lowered downwardly through guide rings 24 in a conventional manner. The inner bore of section 40 in FIG. 4 includes drill pipe 48 having a tool 50 connected to its lower end. Section 40 is lowered until connector 43 on end 42 is received within funnel 46 and connected to connector 56 on end 38 of first section 34.

Figure 4:
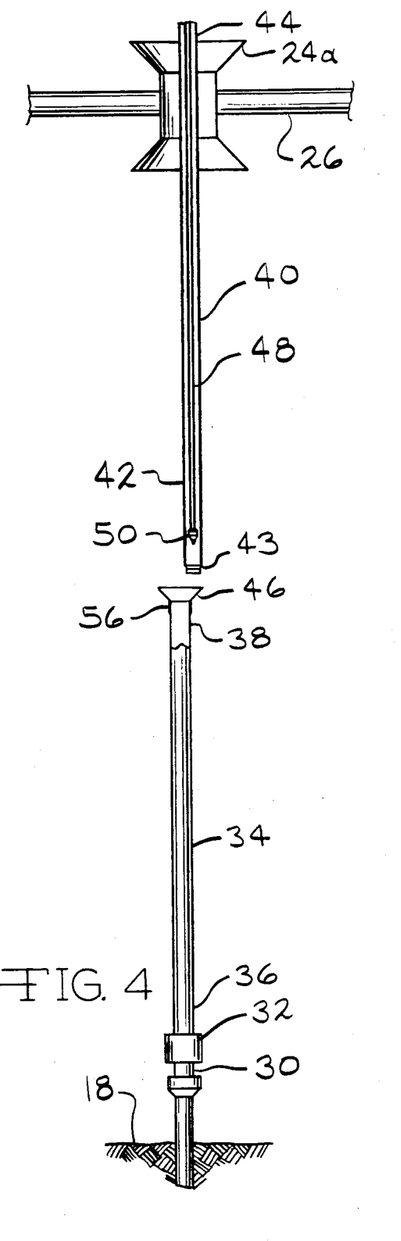
FIG. 4 is a partial elevational view, partially in section, for connecting a second section of a tubular string to the first section shown in FIG. 3.

The embodiment of FIGS. 3 and 4 has guide means 46 provided on end 38 of section 34. In some situations, it may be desirable to provide guide means 46 on end 42 of section 40. See FIG. 5. In this second embodiment, male connector 43 is provided on end 38 of section 34 and female connector 56 is provided on end 42 of section 40.

Figure 6:
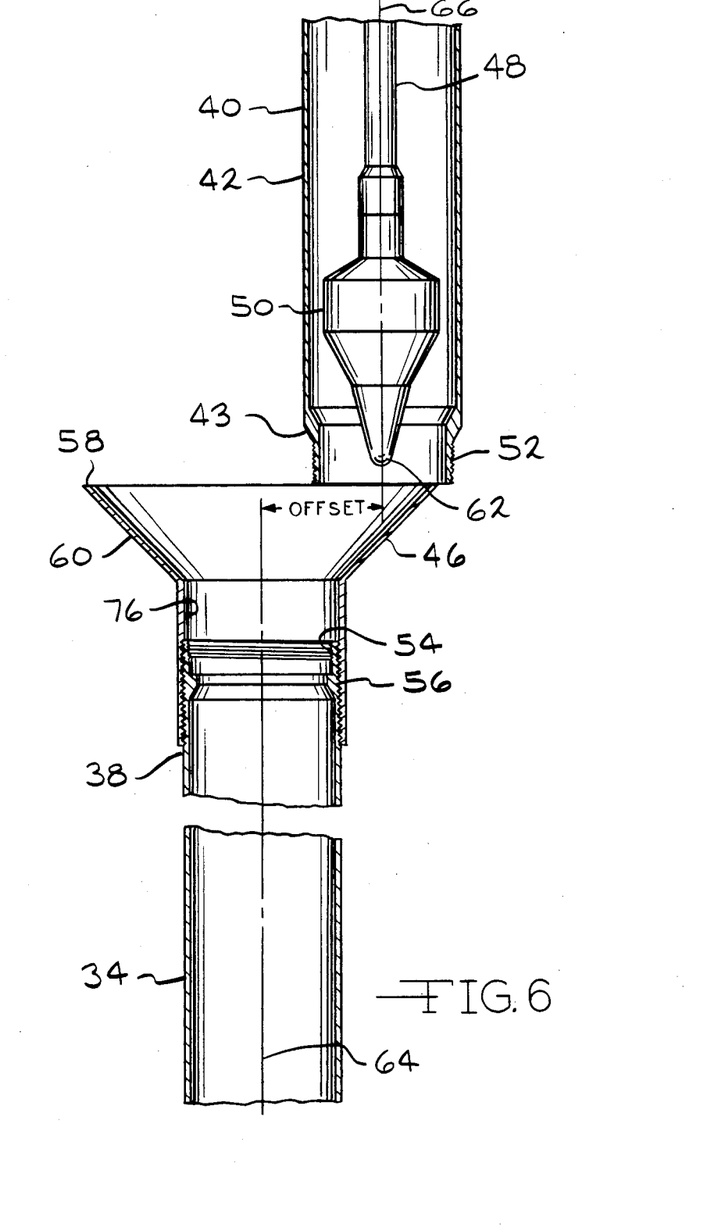
FIG. 6 is a vertical sectional view, partially in section, showing a misaligned second section of a tubular string being engaged with a first section of a tubular string.
Figure 7:
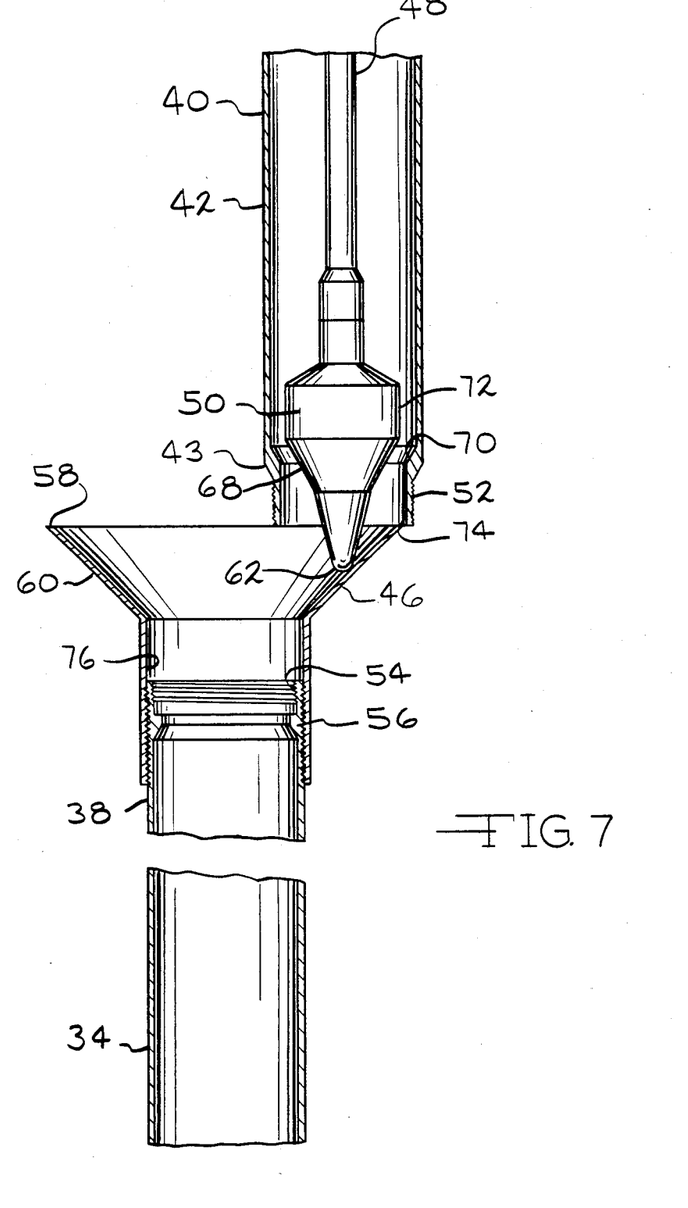
FIG. 7 shows a vertical view, partially in section, of a tool being stabbed into the guide means on the first section of the tubular string.

FIG. 6 illustrates a situation where an offset or misalignment exists between a vertical axis 64 of section 34 which is connected to a subsea installation (see FIG. 4) and an axis 66 of platform 10. Connector 43 of section 40 includes a threaded metal ring 52 for being connected to a threaded portion 54 in connector 56 on section 34. The offset between axes 64 and 66 is such that connector 43 of section 40 is not completely received within a tapered surface 60 of funnel 46. Rather, a portion of connector 43 has engaged an upper surface 58 of funnel 46. If this occurs, tool 50 is lowered by drill pipe 48 until received within funnel 46 as shown in FIG. 7. Spear shaped tool 50 advantageously includes a pointed nose 62. As tool 50 is stabbed into funnel 46 and nose 62 engages tapered surface 60, continued lowering of tool 50 by drill pipe 48 causes nose 62 to slide downwardly along surface 60. Tool 50 is preferably frustoconical shaped having a tapered surface 68 whose upper end just fits through inner tapered surface 70 of connector 43 of section 40. As the lowering of tool 50 is continued, engagement by tapered surface 68 and/or a surface 72 against an inside surface 74 of connector 43 and throat 76 of funnel 46 causes the adjacent ends of section 34 and 40 to become axially aligned. See FIG. 8. After adjacent ends 38 and 42 have become axially aligned, tool 50 can be withdrawn as shown in FIG. 9. Section 40 can now be connected to section 34 by lowering and landing locking ring 52 into portion 54 of connection 56.

Figure 8:
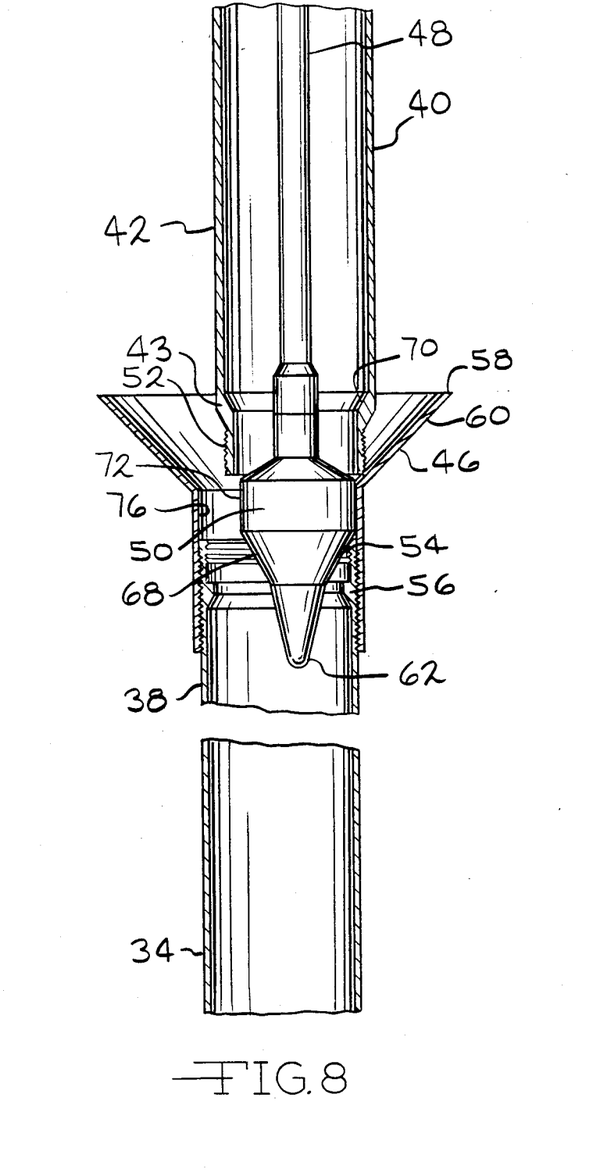
FIG. 8 is a view similar to FIG. 7 except the tool has passed into the inner bore of the first section of the tubular string.
Figure 9:
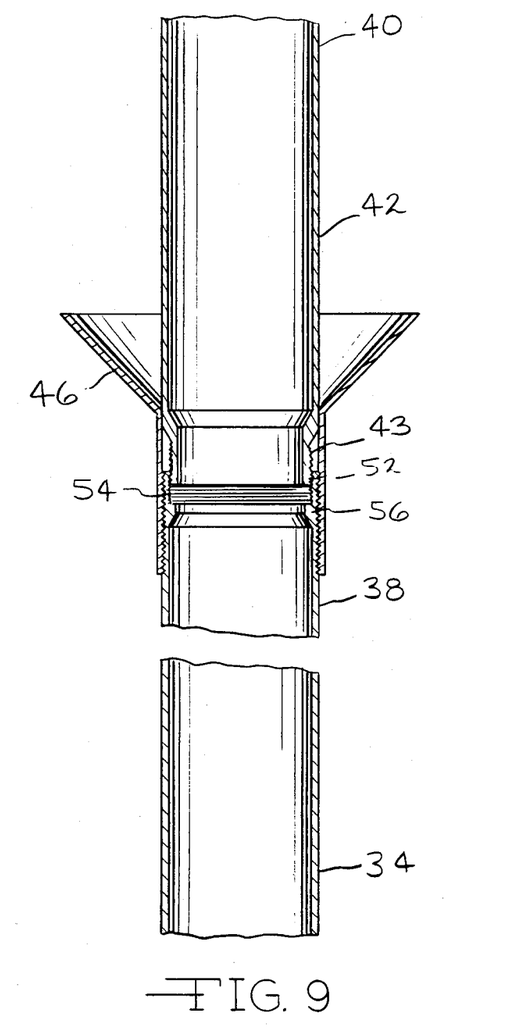
FIG. 9 is an elevational view showing the adjacent ends of the first and second sections of the tubular string being aligned and about to be connected.

The connection shown in FIGS. 3–9 is much easier to make than the conventional connection illustrated in FIGS. 1 and 2. Unliked the conventional approach where the final connection of the tubular string is to a rigid subsea installation, our final connection is to a tall relatively compliant tubular section such as section 34. Unlike the conventional approach where the entire bending and shear loads are absorbed by a single tubular section, they are "shared" by two sections in our method. For example, as shown in FIGS. 7 and 8, surfaces 68 and 72 of tool 50 transfer sufficient lateral force into the inner sidewalls of sections 34 and 40 to bend both adjacent ends substantially equally and into axial alignment. The connection resulting using our invention when an offset exists between the subsea installation and the surface facility results in an arc or S-curve between sections 34 and 40 having a large radius of curvature.

Figure 5:
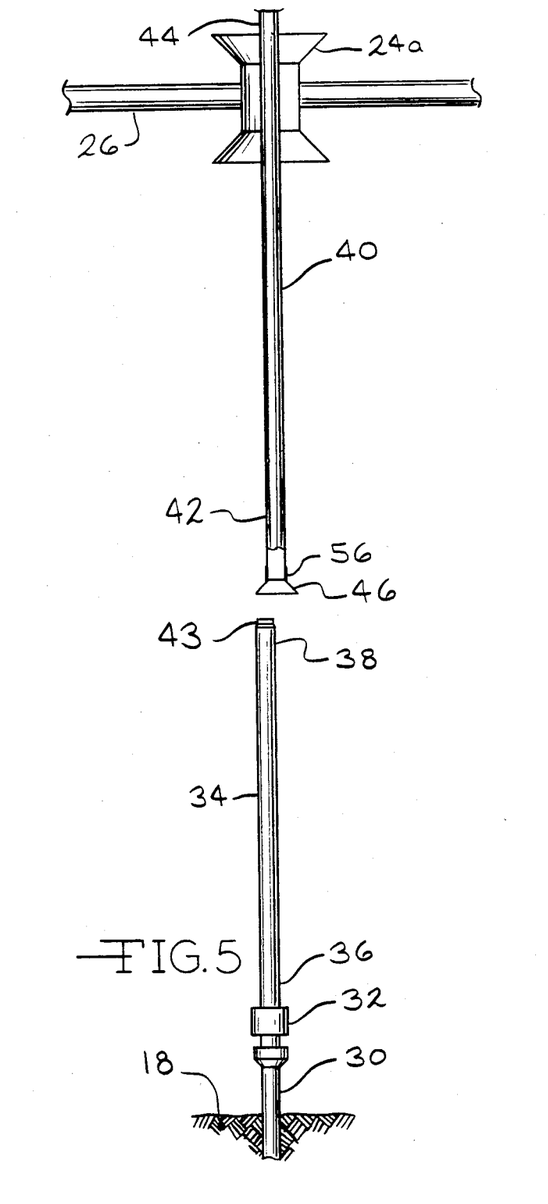
FIG. 5 is a partial elevational view, partially in section, showing another embodiment for connecting a second section of a tubular string to a first section.

The bending moment is a minimum near the midpoint between lowermost guide ring 24a and the top of subsea installation 28. As shown in FIGS. 4 and 5, the length of section 34 preferably equals about one-half the distance from lowermost guide ring 24a and the top of wellhead body 30. The amount of bending required at the point where the connection is made is minimized when misaligned sections 34 and 40 are connected at the midpoint between lowermost guide ring 24a and the top of subsea installation 28. For example, for a 510 foot (155 m) platform whose guide rings 24 are spaced 50 foot (15 m) apart, lowermost guide ring 24a would be about 60 foot (18 m) above seabed 18. If subsea installation 28 is 10 foot tall (3 m), the preferred length for lower section 34 is about 25 foot (8 m). Of course, second section 40 normally would extend back to deck 20 of platform 10 and include many more tubular members than section 34. If so, section 40 would be approximately 475 foot (145 m) long of which about 25 foot (8 m) extends below lowermost guide ring 24a.

While only two embodiments of our invention have been described, it will be understood that various modifications can be made to our invention without departing from the scope of it. For example, hydraulically or mechanically actuated connections may be used to connect the first section to various types of subsea installations. Various designs of stab-type or threaded connections may be used for coupling the second section to the first section. The sequence for assembling the sections may vary. Therefore, the limits of our invention should be determined from the appended claims.

We claim:

1. A method of remotely connecting a tubular string between a surface facility and a subsea installation wherein the vertical axis of the surface facility is misaligned relative to the vertical axis of the subsea installation, the surface facility including a plurality of spaced underwater guides rings along its vertical axis, comprising the steps of:
   lowering a first tubular section from the surface facility to the subsea installation,
   connecting the lower end of said first section to the subsea installation,
   said first section having a length so that its upper end is positioned below the lowermost of the spaced guide rings,
   lowering a second tubular section from the surface facility until the lower end of said second section is adjacent to said upper end of said first section,
   one of the adjacent ends including guide means,
   continue lowering said second section so that said guide means laterally displaces said adjacent ends into vertical alignment,
   connecting said lower end of said second section to said upper end of said first section.

2. A method of remotely connecting a tubular string between a fixed platform and a subsea installation wherein the vertical axis of the platform is misaligned relative to the vertical axis of the subsea installation, the platform including a plurality of spaced underwater guide rings, the tubular string including first and second sections, the length of the first section being approximately one-half the depth between the lowermost guide ring and the top of the subsea installation, the lower ends of the sections including a connector and the upper end of the first section including a connector and a funnel, comprising the steps of:
   lowering the first section from the platform through the guide rings, connecting the lower end of the first section to the subsea installation, lowering the second section from the platform through the guide rings until the lower end of the second section engages the funnel,
   lowering a tapered tool from the platform through the inner bore of the second section until said tool engages the inside surface of the funnel,
   stabbing said tool into the funnel and displacing the adjacent ends of the sections into axial alignment,
   continue lowering the second section until said adjacent ends are connected.

3. The method as set forth in claim 1 wherein said upper end of said first section includes said guide means, including the additional steps of positioning a tool within the bore of said second section,
   lowering said tool from said lower end of said second section into said guide means,
   stabbing said tool against the inside surface of said guide means,
   lowering said tool into said upper end of said first section wherein said adjacent ends of said sections become axially aligned.

4. A method as set forth in claim 1 including the step of lowering said second section and displacing said adjacent ends of said sections into axial alignment resulting from the camming action when one of said adjacent ends slidably engages a tapered surface inside said guide means.

5. A method as set forth in claim 3 wherein said lower end of said second section contacts the top surface of said guide means,
   including the steps of laterally displacing said tool by a camming action resulting from the sliding engagement of said tool against a tapered surface inside said guide means until said tool is urged against the inside surface of said lower end of said second section,
   continue lowering said tool until said lower end of said second section is displaced into alignment with said guide means.

* * * * *